United States Patent
Schmitz et al.

(10) Patent No.: US 10,333,178 B2
(45) Date of Patent: Jun. 25, 2019

(54) ELECTROLYTE COMPOSITIONS CONTAINING ESTERS OF DICARBOXYLIC ACIDS

(71) Applicant: Gotion, Inc., Fremont, CA (US)

(72) Inventors: Rene Schmitz, Mannheim (DE); Lucas Montag, Buerstadt (DE); Diana Fuerst, Ludwigshafen (DE)

(73) Assignee: Gotion Inc., Fremont, CA (US)

( * ) Notice: Subject to any disclaimer, the term of this patent is extended or adjusted under 35 U.S.C. 154(b) by 0 days.

(21) Appl. No.: 15/304,255

(22) PCT Filed: Apr. 15, 2015

(86) PCT No.: PCT/EP2015/058136
§ 371 (c)(1),
(2) Date: Oct. 14, 2016

(87) PCT Pub. No.: WO2015/158755
PCT Pub. Date: Oct. 22, 2015

(65) Prior Publication Data
US 2017/0040649 A1    Feb. 9, 2017

(30) Foreign Application Priority Data
Apr. 17, 2014  (EP) .................. 14165151

(51) Int. Cl.
| H01M 10/42 | (2006.01) |
| H01M 10/052 | (2010.01) |
| H01M 10/0567 | (2010.01) |
| H01M 10/0569 | (2010.01) |
| H01M 10/0525 | (2010.01) |
| H01M 10/0565 | (2010.01) |

(52) U.S. Cl.
CPC ..... *H01M 10/4235* (2013.01); *H01M 10/052* (2013.01); *H01M 10/0525* (2013.01); *H01M 10/0565* (2013.01); *H01M 10/0567* (2013.01); *H01M 10/0569* (2013.01); *H01M 2300/004* (2013.01); *H01M 2300/0037* (2013.01); *H01M 2300/0082* (2013.01)

(58) Field of Classification Search
CPC ........... H01M 10/4235; H01M 10/052; H01M 10/0567; H01M 10/0569; H01M 10/0525; H01M 10/0565; H01M 2300/0037; H01M 2300/004; H01M 2300/0082
See application file for complete search history.

(56) References Cited

U.S. PATENT DOCUMENTS

| 6,117,596 A | 9/2000 | Lee et al. |
| 6,743,549 B1 | 6/2004 | Doyle et al. |
| 2006/0098391 A1 * | 5/2006 | Kanno ............... H01G 9/022 361/503 |
| 2010/0047695 A1 | 2/2010 | Smart et al. |
| 2010/0285373 A1 | 11/2010 | Horikawa |
| 2012/0189920 A1 * | 7/2012 | Li ..................... H01M 4/382 429/331 |
| 2014/0189920 P1 * | 7/2014 | Dibley ............... A01H 5/0294 |

FOREIGN PATENT DOCUMENTS

| EP | 2 230 711 A1 | 9/2010 |
| JP | H11135148 A | 5/1999 |
| JP | 2009146695 A | 7/2009 |
| WO | 2005/099023 A1 | 10/2005 |
| WO | WO 2009/132740 A2 | 11/2009 |
| WO | 2011/059083 A1 | 5/2011 |
| WO | WO 2011/144317 A1 | 11/2011 |
| WO | WO 2013/026854 A1 | 2/2013 |

OTHER PUBLICATIONS

Albrecht Granzow, "Flame Retardation by Phosphorus Compounds", Accounts of Chemical Research, vol. 11, No. 5, 1978, pp. 177-183.
Kang Xu, et al., "Nonflammable Electrolytes for Li-Ion Batteries Based on a Fluorinated Phosphate", Journal of The Electrochemical Society, vol. 149, No. 8, 2002, pp. A1079-A1082.
Kang Xu, et al., "An Attempt to Formulate Nonflammable Lithium Ion Electrolytes with Alkyl Phosphates and Phosphazenes", Journal of The Electrochemical Society, vol. 149, No. 5, 2002, pp. A622-A626.
Ran Elazari, et al., "Rechargeable lithiated silicon-sulfur (SLS) battery prototypes", Electrochemistry Communications, vol. 14, 2012, pp. 21-24.
Swapnil Dalavi, et al., "Nonflammable Electrolytes for Lithium-Ion Batteries Containing Dimethyl Methylphosphonate", Journal of The Electrochemical Society, vol. 157, No. 10, 2010, pp. A1113-A1120.
Sheng Shui Zhang, "A review on electrolyte additives for lithium-ion batteries", Journal of Power Sources , vol. 162, 2006, pp. 1379-1394.
International Search Report dated Jul. 10, 2015 in PCT/EP2015/058136.

* cited by examiner

*Primary Examiner* — Jane J Rhee
(74) *Attorney, Agent, or Firm* — Young Basile Hanlon & MacFarlane, P.C.

(57) ABSTRACT

The invention relates to an electrolyte composition containing (i) at least one aprotic polar organic solvent having a flash point above 80° C. and a dielectric constant above 10 at 25° C.; (ii) at least one flame retardant and/or non-flammable solvent; (iii) at least one compound of formula (I) $R^1$—O(O)C—$(CH_2)_n$—C(O)O—$R^2$ (I) wherein $R^1$ and $R^2$ are independently from each other selected from $C_1$-$C_6$ alkyl and n is 1, 2 or 3; (iv) at least one conducting salt; (v) at least one aprotic organic solvent having a dynamic viscosity below 1 mPa s at 25° C.; and (vi) optionally one or more additives.

19 Claims, No Drawings

ELECTROLYTE COMPOSITIONS CONTAINING ESTERS OF DICARBOXYLIC ACIDS

The present invention relates to an electrolyte composition showing reduced flammability and to electrochemical cells comprising said electrolyte composition.

Storing electrical energy is a subject of still growing interest. Efficient storage of electric energy would allow electric energy to be generated when it is advantageous and used when needed. Secondary lithium batteries are of special interest for energy storage since they provide high energy density due to the small atomic weight and the large ionization energy of lithium and have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents. Most state of the art lithium ion batteries in general comprise not a single solvent but a solvent mixture of different organic aprotic solvents. These organic solvents tend to be flammable. The flammability of the electrolyte composition has caused serious safety concern for the use of lithium ion batteries. One possibility to reduce the flammability of an electrolyte composition composed of organic aprotic solvents is the addition of flame retardant additives like fluorinated alkylphosphates (K. Xu, S. S. Zhang, J. L. Allen, T. R. Jow, Journal of the Electrochemical Society 2002, 149 A1079-A1082), trialkylphosphonates (S. Dalavi, M. Q. Xu, B. Ravdel, L. Zhou, B. L. Lucht, Journal of the Electrochemical Society 2010, 157 A1113-A1120), or alkylphosphates and phosphazenes (K. Xu, M. S. Ding, S. S. Zhang, J. L. Allen, T. R. Jow, Journal of the Electrochemical Society 2002, 149 A622-A626). Usually such flame retardants have to be used in amounts of at least 5 wt.-% or more, based on the entire electrolyte composition to show the desired effect.

The addition of a low viscosity solvent like linear carbonates or carboxylic esters to an electrolyte composition is often necessary to reduce the viscosity of the electrolyte composition. The viscosity of the electrolyte composition has an influence on the ion conductivity; the use of solvents having low viscosity usually increases the ion conductivity of the electrolyte composition.

U.S. Pat. No. 6,743,549 B1 describes electrolyte compositions containing cyclic organic carbonates and a diester of a dicarboxylic acid or a dihydric alcohol. The diesters are added to replace the monoesters and acyclic organic carbonates usually used in combination with the cyclic carbonates as electrolyte solvent mixtures and to yield electrolyte composition having lower flammability and volatility.

U.S. Pat. No. 6,117,596 discloses electrolyte compositions having improved low temperature characteristics comprising a conducting salt and a solvent mixture of a cyclic carbonate, a linear carbonate and a dialkylester of dicarboxylic acids like dimethylmalonate and dimethyladipinate.

WO 2011/144317 A1 describes electrolyte compositions containing at least one organic solvent like organic linear and cyclic carbonates and up to 20 wt.-% of at least one esterified aliphatic dicarboxylic acid containing 3 to 12 C-atoms. The esterified aliphatic dicarboxylic acid is added to reduce the capacity loss of a rechargeable lithium ion battery during cycling.

The need for electrolyte compositions having improved safety properties, in particular reduced flammability, which can also be used at low and at high temperatures still exists. Rechargeable batteries comprising said electrolyte composition should show long lifetime, e.g. good capacity retention during cycling at low and at high temperatures.

These objects are achieved by an electrolyte composition containing
(i) at least one aprotic polar organic solvent having a flash point above 80° C. and a dielectric constant above 10 at 25° C.;
(ii) at least one flame retardant and/or non-flammable solvent;
(iii) at least one compound of formula (I)

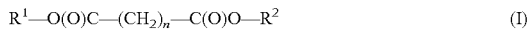

$$R^1-O(O)C-(CH_2)_n-C(O)O-R^2 \qquad (I)$$

wherein
$R^1$ and $R^2$ are independently from each other selected from $C_1$-$C_6$ alkyl and n is 3;
(iv) at least one conducting salt;
(v) at least one aprotic organic solvent having a dynamic viscosity below 1 mPa s at 25° C.; and
(vi) optionally one or more additives.

The present invention also relates to an electrochemical cell comprising the electrolyte composition according to the present invention.

The electrolyte composition according to the present invention containing both a flame retardant (ii) and a compound of formula (I) shows higher flash points than comparative electrolyte composition containing only a flame retardant or a compound of formula (I). Additionally, the effect of a flame retardant present at low concentration is enhanced. The inventive electrolyte composition can be used at low temperature, e.g. at −21° C. Secondary lithium ion batteries comprising the electrolyte composition show good capacity retention during cycling and stable high temperature cycling performance.

The electrolyte composition according to the present invention contains at least one aprotic polar organic solvent (i) having a flash point above 80° C. and a dielectric constant above 10 at 25° C. According to the invention the flashpoint of a solvent or an electrolyte composition may be determined with a Grabner FLP Miniflash instrument, starting the measurement e.g. at 20° C. and finishing at 130° C. with a heating rate of 3.0° C./min. Every 1° C. ignition steps are carried out. As pressure threshold value for identification of the ignition point 25 kPa is used.

Depending on the value of the flash point expected it might be necessary to use a lower starting temperature. The aprotic polar organic solvent (i) is also called polar solvent hereinafter.

According to the invention the aprotic polar organic solvent (i) may be selected from cyclic carbonates, cyclic esters of carboxylic acids, cyclic and acyclic sulfones, cyclic and acyclic dinitriles, and ionic liquids. The cyclic carbonates, cyclic esters of carboxylic acids, cyclic and acyclic sulfones, cyclic and acyclic dinitriles, and ionic liquids may be fluorinated, wherein it is preferred that less than 65% of all H-atoms present in the respective solvent are replaced by F.

Examples of cyclic carbonates are ethylene carbonate (EC), propylene carbonate (PC) and butylene carbonate (BC), wherein one or more H of the alkylene chain may be substituted by one or more substituents selected from F and optionally fluorinated $C_1$ to $C_4$ alkyl group, e.g. 4-methyl ethylene carbonate, monofluoro ethylene carbonate (FEC), 4,4-difluoroethylene carbonate, and 4,5-difluoroethylene carbonate.

Preferred cyclic organic carbonates are monofluoro ethylene carbonate, ethylene carbonate, and propylene carbonate, more preferred are monofluoro ethylene carbonate and ethylene carbonate, in particular preferred is ethylene carbonate.

An example of a cyclic ester of carboxylic acids (lactones) is γ-butyrolactone.

Examples of cyclic and acyclic sulfones are ethyl methyl sulfone, dimethyl sulfone, and tetrahydrothiophene-S,S-dioxide (sulfolane).

An example of cyclic and acyclic dinitriles is adipodinitrile.

Preferably the at least one polar solvent (i) comprises at least one cyclic carbonate, more preferred a cyclic carbonate selected from ethylene carbonate, monofluoro ethylene carbonate, and propylene carbonate, most preferred the at least one polar solvent (i) comprises monofluoro ethylene carbonate and/or ethylene carbonate, and in particular preferred the at least one polar solvent (i) comprises ethylene carbonate.

Preferably the at least one polar solvent (i) is selected from cyclic carbonates, more preferred from ethylene carbonate, monofluoro ethylene carbonate, and propylene carbonate, most preferred from monofluoro ethylene carbonate and ethylene carbonate, and in particular preferred the at least one polar solvent (i) is ethylene carbonate.

The electrolyte composition according to the present invention contains at least one aprotic organic solvent (v) having a dynamic viscosity below 1 mPa s at 25° C. The measurement of the dynamic viscosity is known to the person skilled in the art and may be performed by rotational rheology by using concentric cylinder geometry, e.g. a double gap geometry. The aprotic organic solvent (v) is also called low viscosity solvent hereinafter.

According to the invention the at least one low viscosity solvent (v) may be selected from linear carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, acyclic esters of carboxylic acids, and acyclic nitriles. Preferably the low viscosity solvent (v) has a flash point above −5° C. The flash point of solvent (v) may be determined according to the procedure described above but starting at a lower temperature. The linear carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, acyclic esters of carboxylic acids, and acyclic nitriles may be fluorinated wherein it is preferred that less than 65% of all H-atoms present in the respective solvent are replaced by F.

Examples of linear carbonates are di-$C_1$-$C_{10}$-alkylcarbonates, wherein each alkyl group is selected independently from each other and may be substituted by one or more F. Examples are e.g. diethyl carbonate (DEC), ethyl methyl carbonate (EMC), dimethyl carbonate (DMC), methylpropyl carbonate, diethylcarbonate, fluoromethyl methyl carbonate, difluoromethyl methyl carbonate, trifluoromethyl methyl carbonate, 2-fluoroethylmethyl carbonate, ethylfluoromethyl carbonate, 2,2-difluoroethylmethyl carbonate. Preferred linear carbonates are diethyl carbonate (DEC), ethyl methyl carbonate (EMC), and dimethyl carbonate (DMC), more preferred is dimethylcarbonate.

According to the invention each alkyl group of the di-$C_1$-$C_{10}$-alkylethers is selected independently from the other and may be substituted by one or more F. Examples of di-$C_1$-$C_{10}$-alkylethers are dimethylether, ethylmethylether, diethylether, methylpropylether, diisopropylether, and di-n-butylether.

Examples of di-$C_1$-$C_4$-alkyl-$C_2$-$C_6$-alkylene ethers are 1,2-dimethoxyethane, 1,2-diethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of polyethers are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of cyclic ethers are 1,4-dioxane, tetrahydrofuran, and their derivatives like 2-methyl tetrahydrofuran.

Examples of acyclic acetals are 1,1-dimethoxymethane, and 1,1-diethoxymethane.

Examples of cyclic acetals are 1,3-dioxane, 1,3-dioxolane, and their derivatives such as methyl dioxolane.

Examples of orthocaroxylic esters are tri-$C_1$-$C_4$ alkoxy methane, in particular trimethoxymethane and triethoxymethane. Examples of suitable cyclic ortho esters (f) are 1,4-dimethyl-3,5,8-trioxabicyclo[2.2.2]octane and 4-ethyl-1-methyl-3,5,8-trioxabicyclo[2.2.2]octane.

Examples of acyclic esters of carboxylic acids are ethyl and methyl formiate, ethyl and methyl acetate, ethyl and methyl proprionate, and ethyl and methyl butanoate.

Examples of acyclic nitriles are acetonitrile, propionitrile, and butyronitrile.

Preferably the at least one low viscosity solvent (v) comprises at least one linear carbonate, more preferred at least one linear carbonate selected from dimethyl carbonate, ethylmethyl carbonate, and diethylcarbonate, and most preferred the at least one low viscosity solvent (v) comprises dimethyl carbonate.

Preferably the at least one low viscosity solvent (v) is selected from linear carbonates, more preferred from dimethyl carbonate, ethylmethyl carbonate, and diethylcarbonate, most preferred from dimethyl carbonate.

It is preferred according to the present invention that the electrolyte composition contains at least one polar solvent (i) selected from cyclic carbonates and at least one low viscosity solvent (v) selected from linear carbonates, more preferred the electrolyte composition comprises at least one polar solvent (i) selected from ethylene carbonate, monofluoro ethylene carbonate, and propylene carbonate and at least one low viscosity solvent (v) selected from dimethyl carbonate, ethylmethyl carbonate and diethyl carbonate, most preferred the electrolyte composition comprises ethylene carbonate and dimethyl carbonate.

The electrolyte composition additionally contains at least one flame retardant and/or non-flammable solvent (ii). Flame retardant additives are added to the electrolyte to reduce the flammability. The effect of flame retardants is normally measured by measuring self-extinguishing time of the material. Typically tests are done according to the UL94 norm.

Preferred flame retardants (ii) are organic phosphorous compounds. Organic phosphorous compounds are well known as flame retardant additives for electrolyte compositions for lithium based batteries. Phosphorous flame retardants may be selected from cyclophosphazenes, phosphoramides, alkyl and/or aryl tri-substituted phosphates, alkyl and/or aryl di-substituted phosphites, alkyl and/or aryl di- or tri-substituted phosphonates, alkyl and/or aryl tri-substituted phosphines, alkyl and/or aryl di- or tri-substituted phosphinates, and fluorinated derivatives thereof.

Alkyl and/or aryl tri-substituted phosphates are preferably compounds of general formula (IIa)

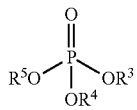

(IIa)

wherein $R^3$, $R^4$ and $R^5$ may be same or different and are independently from each other selected from $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more F, $C_1$-$C_4$ alkyl, phenyl, benzyl or $C_1$-$C_4$ alkyl substituted by one or more F.

Examples of phosphates of formula (IIa) are trimethylphosphate, triethylphosphate, tris(2,2,2-trifluoroethyl)phosphate, bis(2,2,2-trifluoroethyl)methylphosphate, and triphenylphosphate.

Alkyl and/or aryl di- or tri substituted phosphonates are preferably compounds of general formula (IIb)

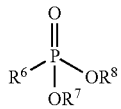

(IIb)

wherein $R^6$ is selected from H, $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more F, $C_1$-$C_4$ alkyl, phenyl, benzyl or $C_1$-$C_4$ alkyl substituted by one or more F, $R^7$ and $R^8$ may be same or different and are independently from each other selected from $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more F, $C_1$-$C_4$ alkyl, phenyl, benzyl or $C_1$-$C_4$ alkyl substituted by one or more F.

If $R^6$ is H compounds of formula (IIb) are di-substituted, if $R^6$ is selected different from H, compounds of formula (IIb) are tri-substituted. Examples of di-substituted phosphonates of formula (IIb) are dimethyl phosphonate, ethyl methyl phosphonate, methyl n-propyl phosphonate, n-butyl methyl phosphonate, diethyl phosphonate, ethyl n-propyl phosphonate, ethyl n-butyl phosphonate, di-n-propyl phosphonate, n-butyl n-propyl phosphonate, and di-n-butyl phosphonate. Examples of tri-substituted phosphonates of formula (IIb) are dimethylmethyl phosphonate and bis(2,2,2-trifluoroethyl) methyl phosphonate.

Alkyl and/or aryl tri-substituted phosphites are preferably compounds of general formula (IIc)

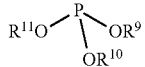

(IIc)

wherein $R^9$, $R^{10}$ and $R^{11}$ may be same or different and are independently from each other selected from $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more F, $C_1$-$C_4$ alkyl, phenyl, benzyl or $C_1$-$C_4$ alkyl substituted by one or more F.

An example of a phosphite of formula (IIc) is tris(2,2,2-trifluoroethyl)phosphite.

Alkyl and/or aryl tri-substituted phosphines are preferably compounds of general formula (IId)

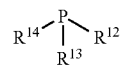

(IId)

wherein $R^{12}$, $R^{13}$ and $R^{14}$ may be same or different and are independently from each other selected from $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more F, $C_1$-$C_4$ alkyl, phenyl, benzyl or $C_1$-$C_4$ alkyl substituted by one or more F.

An example of a phosphine of formula (IId) is triphenylphosphine.

Cyclophosphazenes are preferably compounds of formula (IIe)

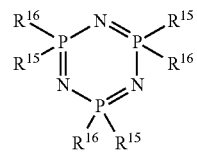

(IIe)

wherein each $R^{15}$ and $R^{16}$ are selected independently from each other from H, F, optionally fluorinated $C_1$-$C_{10}$ alkyl, and optionally fluorinated $OC_1$-$C_{10}$ alkyl, wherein one or more $CH_2$-group of alkyl which is not bound to O may be replaced by O, preferably each $R^{15}$ and $R^{16}$ are selected independently from each other from H, F, optionally fluorinated $C_1$-$C_4$ alkyl and optionally fluorinated $OC_1$-$C_4$ alkyl, wherein one or more $CH_2$-group of alkyl which is not bound to O may be replaced by O and more preferred each $R^{15}$ and $R^{16}$ are selected independently from each other from H, F, and optionally fluorinated $OC_1$-$C_4$ alkyl.

Examples of compounds of formula (IIe) are ethoxypentafluorocyclotriphosphazene, available under the trademark Phoslyte™ E from Nippon Chemical Industrial, hexamethylcyclotriphosphazene, and hexamethoxycyclotriphosphazene, preferred is ethoxypentafluorocyclotriphosphazene.

Phosphoramides are preferably compounds of general formula (IIf)

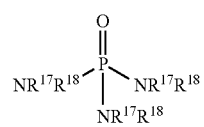

(IIf)

wherein $R^{17}$ and $R^{18}$ may be same or different and are selected independently from each other from H and optionally fluorinated $C_1$-$C_{10}$ alkyl.

An example of a compound of formula (IIf) is hexamethylphosphoramide

Alkyl and/or aryl di- or tri substituted phosphinates are preferably compounds of general formula (IIg)

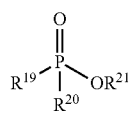
(IIg)

wherein
$R^{19}$ and $R^{20}$ may be same or different and are selected independently from each other from H, $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more substituents selected from F, $C_1$-$C_4$ alkyl, phenyl, benzyl and $C_1$-$C_4$ alkyl substituted by one or more F, with the proviso that only one of $R^{19}$ and $R^{20}$ is H, and $R^{21}$ is selected from $C_1$-$C_{10}$ alkyl, $C_3$-$C_6$ cycloalkyl, benzyl and $C_6$-$C_{12}$ aryl, wherein alkyl, cycloalkyl, benzyl and aryl may be substituted by one or more substituents selected from F, $C_1$-$C_4$ alkyl, phenyl, benzyl and $C_1$-$C_4$ alkyl substituted by one or more F.

Examples of di-substituted phophinates of formula (IIg) are dimethyl phosphonate, diethylphosphinate, and di-n-propylphosphinate. Examples of tri-substituted phosphinates of formula (IIg) are trimethyl phosphonate, triethylphosphinate, and tri-n-propylphosphinate.

The term "$C_1$-$C_{10}$ alkyl" as used herein means a straight or branched saturated hydrocarbon group with 1 to 10 carbon atoms having one free valence and includes, e.g., methyl, ethyl, n-propyl, isopropyl, n-butyl, sec-butyl, isobutyl, tert-butyl, n-pentyl, iso-pentyl, 2,2-dimethylpropyl, n-hexyl, iso-hexyl, 2-ethyl hexyl, n-heptyl, iso-heptyl, n-octyl, iso-octyl, n-nonyl, n-decyl and the like. Preferred are $C_1$-$C_6$alkyl groups, more preferred are $C_1$-$C_4$alkyl groups, and most preferred are methyl, ethyl, and 1- and 2-propyl.

The term "$C_3$-$C_6$ alkyl" as used herein means a 3- to 6 membered cycloalkyl group having one free valence, e.g. cyclopropyl, cyclobutyl, cyclopentyl, and cyclohexyl.

The term "$C_6$-$C_{12}$ aryl" as used herein denotes an aromatic 6- to 12-membered hydrocarbon cycle or condensed cycles having one free valence. Examples of $C_6$-$C_{12}$ aryl are phenyl and naphtyl. Preferred is phenyl.

The term "$C_2$-$C_6$-alkylene" as used herein denotes a branched or linear alkylene chain of 2 to 6 C-atoms having two free valences like ethylene, 1,2-propylene, 1,3-propylene, 1,4-butylene, 1,5-pentylene and 1,6-hexylene, preferred is linear $C_2$-$C_6$-alkylene.

The term "benzyl" as used herein denotes the group $CH_2$—$C_6H_5$.

If the inventive electrolyte composition contains a flame retardant (ii) the flame retardant is preferably selected from cyclophosphanzenes, more preferred it is ethoxypentafluorocyclotriphosphazene.

Typically phosphorous flame-retardants act in the gas phase via a radical recombination mechanism which extinguish the flame, see e.g. A. Granzow, Accounts of Chemical Research 1978, 11 177-183. Therefore, it is important for the efficiency of the flame-retardant additive to have a high vapor pressure and thus a high partial pressure in the gas phase when mixed with the electrolyte. Usually compounds with a high vapor pressure also have low boiling points. According to the present invention flame retardant additives are preferred having boiling points below 250° C.

Component (ii) of the inventive electrolyte composition may also be selected from non-flammable solvents. A non-flammable solvent according to the present invention is a solvent which does not have a flash point. Such solvent may be used to reduce the flammability of electrolyte composition, see e.g. S. S. Zhang, Journal of Power Sources 2006, 162 1379-1394. Combined with standard electrolyte mixtures normally the content of non-flammable solvents in the electrolyte is above 70% to achieve a non-flammability. The flame-retardant effect of non-flammable solvents in electrolytes for lithium batteries is based on the dilution of the highly volatile and flammable solvents by the non-flammable solvent. To optimize this effect the non-flammable solvents should also have a high vapor pressure to ensure that the partial pressure of the non-flammable solvent in the gas phase is high enough so that the electrolyte vapor is non-flammable. According to the present invention non-flammable solvents (ii) having a boiling point below 150° C. are preferred.

The non-flammable solvent (ii) is preferably selected from fluorinated di-$C_1$-$C_{10}$-alkylethers, fluorinated di-$C_1$-$C_4$-alkyl-$C_2$-$C_6$-alkylene ethers and polyethers, fluorinated cyclic or linear esters, and fluorinated cyclic or linear carbonates. More preferred the non-flammable solvent (ii) is selected from fluorinated di-$C_1$-$C_{10}$-alkylethers, fluorinated di-$C_1$-$C_4$-alkyl-$C_2$-$C_6$-alkylene ethers and polyethers, fluorinated cyclic or linear esters, and fluorinated cyclic or linear carbonates wherein at least 65% of all H-atoms present in the respective solvent is replaced by F.

According to the invention each alkyl group of the fluorinated di-$C_1$-$C_{10}$-alkylethers for use as non-flammable solvent (ii) is selected independently from the other and at least one of the alkyl group is substituted by F, preferably at least one alkyl group is substituted by more than one F and more preferred 65% to 100% of all H-atoms of both alkyl groups are replaced by F. Examples of fluorinated di-$C_1$-$C_{10}$-alkylethers are di(trifluoromethyl)ether, (1,1,2,2)-tetrafluoro-3-(1,1,2,2-tetrafluoroethoxy)-propane, and methyl nonafluorobutylether.

Fluorinated di-$C_1$-$C_4$-alkyl-$C_2$-$C_6$-alkylene ethers and polyethers for use as non-flammable solvent (ii) are the di-$C_1$-$C_4$-alkyl-$C_2$-$C_6$-alkylene ethers and polyethers as described above for the low viscosity solvent (v) wherein one or more H of the alkyl or alkylene group(s) are replaced by F.

Examples of fluorinated cyclic or linear esters for use as non-flammable solvent (ii) are fluorinated gamma-butyrolactone, trifluoromethylformiate, trifluoromethyl-2,2,2-trifluoro acetate, and trifluoromethyl-3,3,3-trifluoro propionate.

Examples of fluorinated linear carbonates for use as non-flammable solvent (ii) are di-$C_1$-$C_{10}$-alkylcarbonates, wherein each alkyl group is selected independently from each other and at least one alkyl is fluorinated, i.e. one or more H of the alkyl group may be substituted by F, like di(trifluoromethyl) carbonate, trifluoromethyl (2,2,2-trifluoroethyl) carbonate, and di(2,2,2-trifluoroethyl)carbonate.

Examples of fluorinated cyclic carbonates for use as non-flammable solvent (ii) are ethylene carbonate (EC), propylene carbonate (PC) and butylene carbonate (BC), wherein one or more H of the alkylene chain may be substituted by an $C_1$ to $C_4$ alkyl group and wherein at least one H of the alkylene chain or of the alkyl group is substituted by F, e.g. 4-F-5-trifluoromethyl ethylene carbonate.

If the inventive electrolyte composition contains a non-flammable solvent (ii) it is preferably selected from non-flammable solvents (ii) having a boiling point below 150° C. and/or from non-flammable solvents (ii) selected from fluorinated di-$C_1$-$C_{10}$-alkylethers, fluorinated di-$C_1$-$C_4$-alkyl-$C_2$-$C_6$-alkylene ethers and polyethers, fluorinated cyclic or linear esters, and fluorinated cyclic or linear carbonates wherein at least 65% of all H-atoms present in the respective solvent is replaced by F, more preferred the non-flammable solvent (ii) is selected from non-flammable solvents (ii) having a boiling point below 150° C. which are selected from fluorinated di-$C_1$-$C_{10}$-alkylethers, fluorinated di-$C_1$-$C_4$-alkyl-$C_2$-$C_6$-alkylene ethers and polyethers, fluorinated cyclic or linear esters, and fluorinated cyclic or linear carbonates wherein at least 65% of all H-atoms present in the respective solvent is replaced by F, and most preferred it is selected from (1,1,2,2)-tetrafluoro-3-(1,1,2,2-tetrafluoroethoxy)-propane.

Preferably the inventive electrolyte composition contains at least one flame retardant (ii) which is preferably selected from phosphorous compounds, more preferred the electrolyte composition contains a flame retardant (ii) selected from cyclophosphazenes, and most preferred the inventive electrolyte composition contains at least one flame retardant (ii) selected from ethoxypentafluorocyclotriphosphazene.

The concentration of the at least flame retardant and/or non-flammable solvent (ii) in the electrolyte composition is usually in the range of 0.5 to 20 wt.-%, preferred in the range of 1 to 15 wt.-% and most preferred in the range of 1 to 10 wt.-%.

The inventive electrolyte composition also contains at least one compound of formula (I)

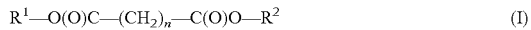

$$R^1\text{—O(O)C—(CH}_2)_n\text{—C(O)O—R}^2 \qquad (I)$$

wherein
$R^1$ and $R^2$ are independently from each other selected from $C_1$-$C_6$ alkyl, preferably from C1-C4 alkyl
and n is 3.

Compounds of formula (I) are di($C_1$ to $C_6$ alkyl) ester of glutaric acid, for example dimethyl glutarate, diethyl glutarate, di-n-propyl glutarate, di-i-propyl glutarate, di-n-butyl glutarate, di-i-butyl glutarate, dipentyl glutarate, and dihexyl glutarate.

Preferred are the glutaric acid di($C_1$ to $C_4$ alkyl) ester, in particular preferred is dimethyl glutaric acid ester.

The electrolyte composition usually contains 10 to 50 wt.-% of at least one compound of formula (I), preferably the electrolyte composition contains more than 20 and up to 50 wt.-% of at least one compound of formula (I), based on the weight of the total electrolyte composition.

Preferred are electrolyte compositions wherein the at least one compound of formula (I) is present in a concentration range of from 10 wt.-% to 50 wt.-% and the at least one flame retardant and/or non-flammable solvent (ii) is present in a concentration range of from 1 wt.-% to 10 wt.-%, based on the weight of the total composition.

Preferably the weight ratio of the at least on aprotic polar solvent having a high flashpoint above 80° C. (i) to the at least one compound of formula (I) to the at least one solvent having a dynamic viscosity below 1 mPa s (v) in the electrolyte composition is (10 to 60):(10 to 70):(5 to 70).

The inventors believe that the reason for beneficial effect of the combined addition of a compound of formula (I) and a flame retardant/non-flammable solvent to an electrolyte composition containing a polar aprotic solvent and a low viscosity solvent, is the complex usually formed by the cation of the conducting salt present in the electrolyte composition and the polar solvent. By forming the complex the vapor pressure of the polar solvent is decreased. Compounds of formula (I) comprise two C(O)O-groups which are connected via 1, 2 or 3 C-atoms. They may act as a bident complexing agents for the cation of the conducting salt resulting in relatively stable 5- to 7-membered cycles. In consequence the compound of formula (I) substitutes the polar aprotic solvent (i) from the complexes with the cation and the partial vapor pressure of the other components present in the electrolyte composition is reduced due to the free polar aprotic solvent molecules (i) (cf. Raoults law). In addition the flame retardant/non-flammable solvent (ii) is more efficient due to the lower vapor pressure of the highly flammable solvent. Dialkylesters of higher dicarboxylic acids like adipinic acid cannot form 5- to 7-membered cycles with the cation due to their longer alkylene chain between the carboxylic ester groups.

The electrolyte composition functions as a medium that transfers ions participating in the electrochemical reaction taking place in an electrochemical cell. The conducting salt(s) present in the electrolyte are usually solvated in the aprotic organic solvent(s). Preferably the conducting salt is a lithium salt. The conducting salt is preferably selected from the group consisting of Li[$F_{6-x}P(C_yF_{2y+1})_x$], wherein x is an integer in the range from 0 to 6 and y is an integer in the range from 1 to 20;

Li[B($R^I$)$_4$], Li[B($R^I$)$_2$(O$R^{II}$O)] and Li[B(O$R^{II}$O)$_2$] wherein each $R^I$ is independently from each other selected from F, Cl, Br, I, $C_1$-$C_4$ alkyl, $C_2$-$C_4$ alkenyl, $C_2$-$C_4$ alkynyl, O$C_1$-$C_4$ alkyl, O$C_2$-$C_4$ alkenyl, and O$C_2$-$C_4$ alkynyl wherein alkyl, alkenyl, and alkynyl may be substituted by one or more O$R^{III}$, wherein $R^{III}$ is selected from $C_1$-$C_6$ alkyl, $C_2$-$C_6$ alkenyl, and $C_2$-$C_6$ alkynyl, and (O$R^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

LiClO$_4$; LiAsF$_6$; LiCF$_3$SO$_3$; Li$_2$SiF$_6$; LiSbF$_6$; LiAlCl$_4$, Li(N(SO$_2$F)$_2$), lithium tetrafluoro (oxalato) phosphate; lithium oxalate; and salts of the general formula Li[Z($C_nF_{2n+1}$SO$_2$)$_m$], where m and n are defined as follows:
    m=1 when Z is selected from oxygen and sulfur,
    m=2 when Z is selected from nitrogen and phosphorus,
    m=3 when Z is selected from carbon and silicon, and
    n is an integer in the range from 1 to 20.

Suited 1,2- and 1,3-diols from which the bivalent group (O$R^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group (O$R^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (OR$^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B(R$^I$)$_4$], Li[B(R$^I$)$_2$(OR$^{II}$O)] and Li[B(OR$^{II}$O)$_2$] are LiBF$_4$, lithium difluoro oxalato borate and lithium dioxalato borate.

Preferably the at least one conducting salt is selected from LiPF$_6$, LiBF$_4$, and LiPF$_3$(CF$_2$CF$_3$)$_3$, more preferred the conducting salt is selected from LiPF$_6$ and LiBF$_4$, and the most preferred conducting salt is LiPF$_6$.

The at least one conducting salt is usually present at a minimum concentration of at least 0.1 mol/l, preferably the concentration of the at least one conducting salt is 0.5 to 2 mol/l based on the entire electrolyte composition.

The electrolyte composition may contain at least one further additive (vi), e.g. the electrolyte composition may contain at least one additive selected from SEI forming additives, overcharge protection additives, wetting agents, HF and/or H$_2$O scavenger, stabilizer for LiPF$_6$ salt, ionic salvation enhancer, corrosion inhibitors, and gelling agents.

An SEI forming additive according to the present invention is a compound which decomposes on an anode to form a passivation layer on the anode which prevents degradation of the electrolyte and/or the anode. In this way, the lifetime of a battery is significantly extended. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a lithium-ion containing cathode, for example lithium cobalt oxide, and an electrolyte containing a small amount of said compound, typically from 0.1 to 10 wt.-% of the electrolyte composition, preferably from 0.2 to 5 wt.-% of the electrolyte composition, more preferably from 0.2 to 2 wt.-%, based on the total weight of the electrolyte composition. Upon application of a voltage between anode and cathode, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. Examples of SEI forming additives are vinylene carbonate and its derivatives, fluorinated the reactive ionic liquids described in WO 2009/132740 A2, the sulphur containing compounds described in WO 2013/026854, lithium oxalato borate, monofluoro ethylene carbonate, sultones like propane sultone and propene sultone, and the like.

Examples of overcharge protection additives are aromatic compounds like anisol derivatives, biphenyl and its derivatives, cyclohexylbenzene and its derivatives, etc.

Examples of HF and/or H$_2$O scavenger are optionally halogenated cyclic and acyclic silylamines.

A compound added as additive may have more than one effect in the electrolyte composition and the device comprising the electrolyte composition. E.g. lithium oxalato borate may be added as additive enhancing the SEI formation but may also be added as conducting salt.

If one or more additives are present in the electrolyte composition, the total concentration of further additives is at least 0.001 wt.-%, preferred 0.005 to 5 wt.-% and most preferred 0.01 to 2 wt.-%, based on the total weight of the electrolyte composition.

When a solvent is present in the electrolyte of the invention a polymer may also be included, the polymer being polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. These polymers are added to the electrolytes in order to convert liquid electrolytes into quasi-solid or solid electrolytes and thus to improve solvent retention, especially during ageing.

The electrolyte compositions of the invention are prepared by methods which are known to the person skilled in the field of the production of electrolytes, e.g. by dissolving the conductive salt and flame retardant in the corresponding solvent mixture.

The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The content of HF of the inventive electrolyte composition is preferably below 60 ppm, based on the weight of the electrolyte composition, more preferred below 40 ppm, most preferred below 20 ppm. The HF content may be determined by titration according to potentiometric or potentiographic titration method.

A preferred electrolyte composition according to the present invention contains
(i) 10 to 60 wt % of at least one aprotic polar organic solvent having a flash point above 80° C. and a dielectric constant above 10 at 25° C.;
(ii) 1 to 10 wt % of at least one flame retardant and/or non-flammable solvent;
(iii) 10 to 70 wt % of at least one compound of formula (I)

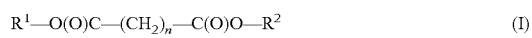

$$R^1—O(O)C—(CH_2)_n—C(O)O—R^2 \qquad (I)$$

wherein
R$^1$ and R$^2$ are independently from each other selected from $C_1$-$C_6$ alkyl and n is 1,2 or 3;
(iv) 0.5 to 2 mol/l of at least one conducting salt; and
(v) 5 to 70 wt % of at least one aprotic organic solvent having a dynamic viscosity below 1 mPa s at 25° C.; and
(vi) 0 to 5 wt.-% of one or more additives;
based on the entire electrolyte composition.

The invention further provides an electrochemical cell comprising
(A) the electrolyte composition as described above,
(B) at least one cathode comprising at least one cathode active material, and
(C) at least one anode comprising at least one anode active material.

The general construction of such electrochemical cells is known and is familiar to the person skilled in this art—for batteries, for example, in Linden's Handbook of Batteries (ISBN 978-0-07-162421-3).

Preferably the electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds; e.g. the lithium battery may be a lithium ion battery, a lithium/sulphur battery, or a lithium/selenium sulphur battery.

In particular preferred the electrochemical cell is a lithium ion battery, i.e. secondary lithium ion electrochemical cell comprising a cathode comprising a cathode active material that can reversibly occlude and release lithium ions and an anode comprising an anode active material that can reversibly occlude and release lithium ions. The terms "secondary lithium ion electrochemical cell" and "(secondary) lithium ion battery" are used interchangeably within the present invention.

The at least one cathode active material preferably comprises a material capable of occluding and releasing lithium ions selected from lithiated transition metal phosphates and lithium ion intercalating metal oxides.

Examples of lithiated transition metal phosphates are $LiFePO_4$ and $LiCoPO_4$, examples of lithium ion intercalating metal oxides are $LiCoO_2$, $LiNiO_2$, mixed transition metal oxides with layer structure having the general formula $Li_{(1+z)}[Ni_aCo_bMn_c]_{(1-z)}O_{2+e}$ wherein z is 0 to 0.3; a, b and c may be same or different and are independently 0 to 0.8 wherein a+b+c=1; and $-0.1 \le e \le 0.1$, and manganese-containing spinels like $LiMnO_4$ and spinels of general formula $Li_{1+t}M_{2-t}O_{4-d}$ wherein d is 0 to 0.4, t is 0 to 0.4 and M is Mn and at least one further metal selected from the group consisting of Co and Ni, and $Li_{(1+g)}[Ni_hCo_iAl_j]_{(1-g)}O_{2+k}$. Typical values for g, h, I, j and k are: g=0, h=0.8 to 0.85, i=0.15 to 0.20, j=0.02 to 0.03 and k=0.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

The anode comprised within the lithium batteries of the present invention comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material is silicon which is able to intercalate lithium ions. The silicon may be used in different forms, e.g. in the form of nanowires, nanotubes, nanoparticles, films, nanoporous silicon or silicon nanotubes. The silicon may be deposited on a current collector. The current collector may be a metal wire, a metal grid, a metal web, a metal sheet, a metal foil or a metal plate. Preferred the current collector is a metal foil, e.g. a copper foil. Thin films of silicon may be deposited on metal foils by any technique known to the person skilled in the art, e.g. by sputtering techniques. One possibility of preparing Si thin film electrodes are described in R. Elazari et al.; Electrochem. Comm. 2012, 14, 21-24. It is also possible to use a silicon/carbon composite as anode active material according to the present invention.

Other possible anode active materials are lithium ion intercalating oxides of Ti.

Preferably the anode active material is selected from carbonaceous material that can reversibly occlude and release lithium ions, particularly preferred the carbonaceous material that can reversibly occlude and release lithium ions is selected from crystalline carbon, hard carbon and amorphous carbon, in particular preferred is graphite. In another preferred embodiment the anode active is selected from silicon that can reversibly occlude and release lithium ions, preferably the anode comprises a thin film of silicon or a silicon/carbon composite. In a further preferred embodiment the anode active is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium batteries may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive lithium batteries may be combined with one another, for example in series connection or in parallel connection. Series connection is preferred. The present invention further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers. But the inventive lithium ion batteries can also be used for stationary energy stores.

Even without further statements, it is assumed that a skilled person is able to utilize the above description in its widest extent. Consequently, the preferred embodiments and examples are to be interpreted merely as a descriptive enclosure which in no way has any limiting effect at all. Combinations of different embodiments fall within the scope of the current invention.

The invention is illustrated by the examples which follow, which do not, however, restrict the invention.

I. Electrolyte Compositions

The electrolyte compositions were prepared from ethylene carbonate (EC), dimethyl carbonate (DMC), ethylmethyl carbonate (EMC), dimethyl malonate (DBE-3), dimethyl succinate (DBE-4), dimethyl glutarate (DBE-5), dimethyl adipate (DBE-6), ethoxypentafluorocyclotriphosphazene (Phoslyte™ E, purchased from Nippon Chemical Industrial, abbreviated hereinafter as J2), vinylene carbonate (VC) and $LiPF_6$. The concentrations are shown in Tables 1, 3, 5, and 6.

2. Flash Points and Flammability

The flashpoints of the electrolyte compositions were determined with a Grabner FLP Miniflash instrument. The starting temperature Ti was 20° C. and the final temperature Tf was 130° C. Every 1° C. ignition steps were carried out. The heating rate was 3.0° C./min. As pressure threshold value for identification of the ignition point 25 kPa were used.

The flammability of an electrolyte composition is typically determined by measuring the self-extinguishing time (SET). This value can be measured by soaking up the electrolyte into a non-flammable carrier, a glass fiber filter. After ignition of the thus soaked carrier by a lighter the time is recorded until the flame ceases burning without external influence. The time is divided by the weight of the electrolyte composition which has been soaked into the carrier to arrive at the SET, which is reported in seconds per gram (s/g). The smaller this value the lower the flammability of an electrolyte composition. In the presented experiments the soaked carrier was kept in a hood with an air flow of from 610 to 660 $m^3$/h in order to obtain reproducible SET values. The soaked carrier was surrounded by a glass box with an opened top to minimize turbulences or variations of the air flow around the soaked carrier. The dimensions of the box were 60 cm width, 40 cm depth, and 100 cm height. If a sample shows lower flammability it might be that the sample does not burn after the first try of ignition of the sample. The average number of ignition tries to start burning is also a measure of the flammability of a sample, i.e. the higher the number of ignition tries is, the lower is the flammability. Instead of the self-extinguishing time the number of tries to ignite the sample is shown in Table 1.

3. Low Temperature Appearance

To determine if the electrolyte mixtures are solid at −21° C. the electrolyte solutions were stored overnight in a freezer. If the electrolyte is solid the battery cannot be used at these temperatures. The results are shown in Table 1.

TABLE 1

| Sample | Electrolyte composition | Ignition try's to start burning average of 6 tests | Flash-point [° C.] | Solid at −21° C. |
|---|---|---|---|---|
| 1 (inventive) | 1M $LiPF_6$ in EC:DBE-5:DMC 33:25:42 by wt. and 5 wt.-% J2 | 12 | 39 | no |
| 2 (inventive) | 1M $LiPF_6$ in EC:DBE-5:DMC 33:25:42 by wt. and 2 wt.-% J2 | 7 | 34 | no |
| 3 (comparative) | 1M $LiPF_6$ in EC:DBE-5:DMC 33:25:42 by wt. | 2 | 29 | no |
| 4 (comparative) | 1M $LiPF_6$ in EC:EMC 3:7 by wt. and 5 wt.-% J2 | 3 | | no |
| 5 (comparative) | 1M $LiPF_6$ in EC:DMC 3:7 by wt. and 2 wt.-% J2 | 3 | 25 | yes |
| 6 (comparative) | 1M $LiPF_6$ in EC:DMC 3:7 by wt. and 5 wt.-% J2 | 16 | 30 | yes |

As can be seen from the results shown in Table 1, the inventive electrolyte compositions containing both a compound of formula (I) and a flame retardant have higher flash points than the comparative electrolytes containing only the flame retardant or the compound of formula (I). Additionally the inventive electrolyte compositions are all liquid at −21° C. allowing their use at low temperatures. The effect of the flame retardant at low concentration is enhanced by the addition of the compound of formula (I).

4. Electrochemical Tests 4.1) Cycling at 25° C.

Button cells were fabricated using lithium nickel cobalt manganese oxide (LiNi0.33Co0.33$Mn_{0.33}O_2$, NCM 111) electrodes with a capacity of 2 mAh/$cm^2$ and a graphite electrode with a capacity of 2.15 mAh/$cm^2$. A glass-fiber filter separator (Whatmann GF/D) was used as separator, which was soaked with 100 μl of the respective electrolyte composition. All electrochemical measurements were carried out at 25° C. in climate chambers. The discharge capacity of the cell was measured with regard to the cycling number according to procedure shown in Table 2. After cycle 69, the program from cycle 16 to 69 was repeated twice. Beginning from cycle 3 the cell is charged in addition with a final charge potential of 4.2 V for maximum half an hour or until charge current drops below C/20.

TABLE 2

| Cycle | Charge-/discharge rate in C |
|---|---|
| 1-2 | 0.2 |
| 3-12 | 0.5 |
| 13-15 | 1 |
| 16-18 | 2 |
| 19-21 | 4 |
| 22-69 | 1 |

The results of the cycling are shown in Table 3.

TABLE 3

| Sample | Electrolyte composition | 2 C rate [mAh g$^{-1}$] cycle 17 | 4 C rate [mAh g$^{-1}$] cycle 20 | Capacity retention after 100 cycles based on 23th cycle [%] |
|---|---|---|---|---|
| 7 (inventive) | 1M LiPF$_6$ in EC:DBE-5:DMC 33:25:42 by wt. 5 wt.-% J2 + 2 wt.-% VC | 124 | 70 | 97.2 |
| 8 (comparative) | 1M LiPF$_6$ in EC:DMC 3:7 by wt. + 2 wt.-% VC + 2 wt.-% J2 | 130 | 109 | 98.7 |
| 9 (inventive) | 1M LiPF$_6$ in EC:DBE-5:DMC 33:25:42 by wt. + 2 wt.-% J2 + 2 wt.-%VC | 122 | 63 | 96.6 |

The inventive electrolyte compositions containing both a compound of formula (I) and a flame retardant show similar capacity retention after 100 cycles as the comparative example containing the flame retardant but does not contain a compound of formula (I).

4.2 Cycling at 45° C.

Button cells were fabricated using lithium nickel cobalt manganese oxide (LiNi$_{0.5}$Co$_{0.2}$Mn$_{0.3}$O$_2$, NCM 523) electrodes with a capacity of around 2 mAh/cm$^2$ and a graphite electrode with a capacity of 2.15 mAh/cm$^2$. A glass-fiber filter separator (Whatmann GF/D) was used as separator, which was soaked with 100 µl of the respective electrolyte composition. For electrochemical testing of the cycling behavior the procedure displayed in Table 4 was used. "@4.3 V until I<0.01 C or t>30 min" means that the cell was charged at a constant voltage of 4.3 V until the electric current I was lower than 0.01 Coulomb or the charging time exceeded the time of 30 minutes. The cut-off voltage of during charging was 4.3 V, the cut-off voltage during discharging was 3.0 V.

TABLE 4

| Cycle | Charge rate in C | Constant voltage charge | Discharge rate in C | Temperature [° C.] |
|---|---|---|---|---|
| 1 | 0.1 | None | 0.1 | 25 |
| 2 | 0.2 | None | 0.2 | 25 |
| 3-6 | 0.5 | @4.3 V until I < 0.01 C or t > 30 min | 0.5 | 25 |
| 7 | 0.2 | @4.3 V until I < 0.01 C or t > 30 min | 0.2 | 25 |

TABLE 4-continued

| Cycle | Charge rate in C | Constant voltage charge | Discharge rate in C | Temperature [° C.] |
|---|---|---|---|---|
| 8 | 0.2 | @4.3 V until I < 0.01 C or t > 30 min | 0.5 | 25 |
| 9 | 0.2 | @4.3 V until I < 0.01 C or t > 30 min | 1 | 25 |
| 10 | 0.2 | @4.3 V until I < 0.01 C or t > 30 min | 2 | 25 |
| 11 | 0.2 | @4.3 V until I < 0.01 C or t > 30 min | 3 | 25 |
| 12 | 0.2 | @4.3 V until I < 0.01 C or t > 30 min | 4 | 25 |
| 13 | 0.2 | @4.3 V until I < 0.01 C or t > 30 min | 5 | 25 |
| 14 | 0.2 | @4.3 V until I < 0.01 C or t > 30 min | 6 | 25 |
| 15-18 | 0.5 | @4.3 V until I < 0.01 C or t > 30 min | 0.5 | 25 |
| 19-118 | 1 | @4.3 V until I < 0.01 C or t > 30 min | 1 | 45 |

The results of the cycling are displayed in Table 5.

TABLE 5

| Sample | Electrolyte composition | 2 C rate [mAh g$^{-1}$] | Capacity retention after 100 cycles based on 19th cycle [%] |
|---|---|---|---|
| 10 (inventive) | 1M LiPF$_6$ in EC:DBE-5:DMC 33:25:42 by wt. + 5 wt.-% J2 + 2 wt.-% VC | 143 | 96 |
| 11 (comparative) | 1M LiPF$_6$ in EC:DMC 1:1 by wt. + 5 wt.-% J2 + 2 wt.-% VC | 153 | 92 |
| 12 (comparative) | 1M LiPF$_6$ in EC:EMC 3:7 by wt. + 5 wt.-% J2 + 2 wt.-% VC | 153 | 96 |
| 13 (comparative) | 1M LiPF$_6$ in EC:DBE-3:DMC 33:25:42 by wt. + 5 wt.-% J2 + 2 wt.-% VC | 133 | 37 |
| 14 (comparative) | 1M LiPF$_6$ in EC:DBE-4:DMC 33:25:42 by wt. + 5 wt.-% J2 + 2 wt.-% VC | 149 | 93 |
| 15 (comparative) | 1M LiPF$_6$ in EC:DBE-6:DMC 33:25:42 by wt. + 5 wt.-% J2 + 2 wt.-% VC | 146 | 95 |

The inventive electrolyte composition containing EC, DMC and dimethyl glutarate shows better cycling performance at 45° C. than similar electrolyte compositions containing no diester or containing dimethyl malonate or dimethyl succinate.

5. DSC-Measurements

The end of melting of different electrolyte compositions was determined by DSC measurements in a TA-Instruments DSC Q2000 RCS system. 8 to 10 mg of electrolyte composition were filled in aluminum pans (Perkin Elmer) and a spatula tip of Aluminum-oxide was added as crystal nucleus. The aluminum pans were sealed afterwards. The aluminum pans were cooled down to −98° C. with a cooling rate of 20 K/min and kept at this temperature for 2 min. The samples were then heated to 30° C. with a heating rate of 2° C. The point at which all endothermic phase transfers are completed and the endothermic heat flow is below 0.08 W/g and no change in heat flow can be observed at higher temperatures is defined as melting end. The results are shown in Table 6.

TABLE 6

| Sample | Electrolyte composition | End of melting [° C.] |
|---|---|---|
| 16 (inventive) | 1M LiPF$_6$ in EC:DBE-5:DMC 33:25:42 by wt. + 5 wt.-% J2 + 2 wt.-% VC | −28 |
| 17 (comparative) | 1M LiPF$_6$ in EC:DMC 1:1 by wt. + 5 wt.-% J2 + 2 wt.-% VC | −5 |
| 18 (comparative) | 1 M LiPF$_6$ in EC:EMC 3:7 by wt. + 5 wt.-% J2 + 2 wt.-% VC | −22 |
| 19 (comparative) | 1M LiPF$_6$ in EC:DBE-3:DMC 33:25:42 by wt. + 5 wt.-% J2 + 2 wt.-% VC | −18 |
| 20 (comparative) | 1M LiPF$_6$ in EC:DBE-4:DMC 33:25:42 by wt. + 5 wt.-% J2 + 2 wt.-% VC | −18 |
| 21 (comparative) | 1M LiPF$_6$ in EC:DBE-6:DMC 33:25:42 by wt. + 5 wt.-% J2 + 2 wt.-% VC | −18 |

As can be seen from Table 6 the end of the melting process of the inventive electrolyte composition containing dimethyl glutarate is lower than that of comparative electrolyte compositions containing other diesters like dimethyl malonate, dimethyl succinate and dimethyl adipate.

The invention claimed is:

1. An electrolyte composition, comprising:
   (i) at least one aprotic polar organic solvent which has a flash point above 80° C. and a dielectric constant above 10 at 25° C.;
   (ii) at least one flame retardant and/or a non-flammable solvent;
   (iii) at least one compound of the formula (I)

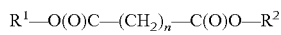

R$^1$—O(O)C—(CH$_2$)$_n$—C(O)O—R$^2$ wherein
   R$^1$ and R$^2$ are each independently a C$_1$-C$_6$ alkyl, and n is 3;
   (iv) at least one conducting salt; and
   (v) at least one aprotic organic solvent which has a dynamic viscosity below 1 mPa s at 25° C., wherein the amount of the compound of formula (I) is present in a concentration range of from greater than 20 wt.-% to 50 wt.-% based on the total weight of the electrolyte composition.

2. The electrolyte composition according to claim 1, wherein the at least one aprotic polar organic solvent (i) is selected from the group consisting of cyclic carbonates, cyclic esters of carboxylic acids, cyclic and acyclic sulfones, cyclic and acyclic dinitriles and ionic liquids.

3. The electrolyte composition according to claim 1, wherein the flame retardant (ii) is present and is an organic phosphorous compound.

4. The electrolyte composition according to claim 3, wherein the organic phosphorous compound is at least one selected from the group consisting of cyclophosphazenes, phosphoramides, alkyl and/or aryl tri-substituted phosphates, alkyl and/or aryl di-substituted phosphites, alkyl and/or aryl di- or tri-substituted phosphonates, alkyl and/or aryl tri-substituted phosphines, alkyl and/or aryl di- or tri-substituted phosphinates, and fluorinated derivatives thereof.

5. The electrolyte composition according to claim 1, wherein the non-flammable solvent (ii) is present and has a boiling point below 150° C.

6. The electrolyte composition according to claim 1, wherein the non-flammable solvent (ii) is present and is at least one selected from the group consisting of fluorinated di-C$_1$-C$_{10}$-alkylethers, fluorinated di-C$_1$-C$_4$-alkyl-C$_2$-C$_6$-alkylene ethers and polyethers, fluorinated cyclic or linear esters, and fluorinated cyclic or linear carbonates, and wherein at least 65% of all H-atoms present in the non-flammable solvent (ii) are replaced by F.

7. The electrolyte composition according to claim 1, wherein the compound of formula (I) is a glutaric acid di(C$_1$ to C$_4$ alkyl) ester.

8. The electrolyte composition according to claim 1, wherein the compound of formula (I) is glutaric acid dimethyl ester.

9. The electrolyte composition according to claim 1, wherein
   the at least one flame retardant and/or non-flammable solvent (ii) is present in a concentration range of from 1 wt.-% to 10 wt.-%,
   based on the weight of the total composition.

10. The electrolyte composition according to claim 1, wherein the conducting salt (iv) is a lithium salt.

11. The electrolyte composition according to claim 1, wherein the aprotic organic solvent which has a dynamic viscosity below 1 mPa s (v) is at least one selected from the group consisting of linear carbonates, di-C$_1$-C$_{10}$-alkylethers, di-C$_1$-C$_4$-alkyl-C$_2$-C$_6$-alkylene ethers and polyethers, cyclic ethers, cyclic and acyclic acetals and ketals, orthocarboxylic acids esters, acyclic esters of carboxylic acids, and acyclic nitriles.

12. The electrolyte composition according to claim 1, further comprising at least one additive (vi).

13. The electrolyte composition according to claim 1, wherein the weight ratio of the at least one aprotic polar solvent which has a high flashpoint above 80° C. (i) to the at least one compound of formula (I) to the at least one aprotic organic solvent which has a dynamic viscosity below 1 mPa s (v) is (10 to 60): (10 to 70): (5 to 70).

14. An electrochemical cell, comprising:
   (A) the electrolyte composition according to claim 1,
   (B) at least one cathode comprising at least one cathode active material, and
   (C) at least one anode comprising at least one anode active material.

15. The electrochemical cell according to claim 14, wherein the electrochemical cell is a lithium battery.

16. The electrolyte composition according to claim 12, wherein the additive (vi) is at least one selected from the group consisting of a SEI forming additive, an overcharge protection additive, a wetting agent, a HF scavenger, a H$_2$O scavenger, a stabilizer for a LiPF$_6$ salt, an ionic salvation enhancer, a corrosion inhibitor, and a gelling agent.

17. The electrolyte composition according to claim 1 which has a flashpoint of greater than 32° C.

18. The electrolyte composition according to claim 1 which has a reduced flammability in terms of self-extinguishing time, number of ignition tries, or both relative to a substantially identical electrolyte composition lacking at least one component selected from the group consisting of
   the compound of formula (I), and
   the flame retardant and/or the non-flammable solvent (ii).

19. The electrolyte composition according to claim 1 which has an end of melting process temperature of less than −25° C.

* * * * *